United States Patent Office 3,366,001
Patented Jan. 30, 1968

3,366,001
HIGH STRENGTH-HIGH TEMPERATURE YARN
Robert Henry Meserole, Middlesex, N.J., assignor to Johns-Manville Corporation, New York, N.Y., a corporation of New York
No Drawing. Filed Dec. 11, 1964, Ser. No. 417,787
4 Claims. (Cl. 87—6)

ABSTRACT OF THE DISCLOSURE

A high temperature yarn of improved workability consisting of an inner strand of silica fibers encased within a sheathing of a pliant braid of strands of synthetic plastic which is removable by vaporization upon exposure to temperatures of less than about 1,000° F.

---

This invention relates to yarn for high temperature applications having good handling and working properties, and means of producing the same. More particularly the invention is directed to high temperature resistant yarns and sewing threads which can be machine worked or sewn.

High purity silica yarns or threads, comprising the material resulting from acid leaching the metal oxides or fluxes from common glass fiber compositions, effectively maintain their strength and integrity throughout all temperatures ranging up to about 3000° F., or approximately the melting point of the silica composition thereof. Refractory silica fibers and products thereof are illustrated by several commercially available materials of this category comprising the silica fibers, or yarns and cloth thereof, of the H. I. Thompson Company, sold under the trademark "Refrasil" and Haveg Industries' "Sil-Temp." These consist of silica fibers of about 95 to 99% or greater purity produced by acid leaching techniques illustrated in U.S. Letters Patent No. 2,491,761 and No. 2,995,803. The very high temperature stability of substantially pure silica fibers and their fiber size renders them uniquely applicable for use in many insulations designed for the ultra high temperatures and rigorous conditions of the aerospace field, and they are frequently utilized in the construction and fabrication of insulations or components thereof for such aerospace service. Notwithstanding the unsurpassed function of these silica fibers in maintaining their properties under such conditions once applied or incorporated into the insulation or component thereof, their inherent lack of flexibility and appreciable brittleness renders them unsuitable for most conventional handling and applying operations and demands careful hand working such as sewing or stitching and the like time consuming forming means with the result that their use in many potential applications is economically prohibited because of labor cost.

Previous techniques proposed for overcoming the strength and/or flexibility shortcomings of refractory fibers such as the substantially pure silica fibers or fibrous products thereof and in particular yarn, have frequently involved the introduction or blending of stronger and/or more flexible "carrier" fibers with the principal refractory silica fibers to reinforce or compensate for the deficiencies of the latter. However, such techniques or means inherently entail the introduction into the body of the high temperature yarn a component of inferior properties in some basic aspect such as temperature resistance whereby upon subsequent burnout of the carrier at temperatures below the maximum limit of the principal silica fiber voids are left within the body of the yarn loosening its construction or integrity which in turn impairs the subsequent strength of the yarn and its securing or retention capacity. Moreover the thermal decomposition of carrier fibers frequently produces alien matter such as incandescent solids or bodies which may modify the properties or exert undesirable effects upon the surrounding components or equipment. For example, cotton, a common carrier fiber for more brittle refractory fibrous materials, produces incandescent carbon upon burning, and although many compositions of glass fibers as carriers resist deterioration up to appreciably higher temperatures than cotton, substantially all glasses melt significantly below the maximum limit of pure silica fibers producing molten matter or globules.

It is the primary object of this invention to provide a high purity silica yarn product for sewing, stitching, weaving, etc., which possesses ample strength and flexibility for use in conventional machine handling and applying operations such as machine sewing and which does not entail any components or effects adversely influencing either the yarn, or the ultimate product, or the functions thereof.

It is a more specific object of this invention to provide a silica yarn product of high flexural and tensile strength suitable for machine handling and working which does not contain or introduce any materials deleterious to conventional insulating components or structures, aircraft or rocket frames or structures, electron equipment and the like aerospace or other units, or impair their functions.

It is also an object of this invention to provide an economical means of imparting high tensile and flexural strength to a high purity silica yarn products without degrading their desirable high temperature properties or their effects on surroundings, and enabling their use in normal machine sewing or other mechanical handling and working operations.

These and other objects and advantages of this invention will be more apparent from the hereinafter detailed description thereof.

This invention generally comprises the sheathing or encasing of brittle silica yarns within a high tensile strength, woven, knitted, braided, or similarly formed flexible containing body, which may be termed a "braid," fabricated from strands of a class of organic plastic materials which readily completely vaporize upon exposure to elevated temperatures of up to about 900 or 1000° F. without forming or introducing deleterious combustion products such as incandescent solids or particles, or otherwise degrading the yarn or surrounding materials or components and their functions.

The silica fiber yarn component or core of the product of this invention comprises any of the commercially available or similar silica yarns resistant to temperatures approaching the melting point of silica, viz., about 3000° F. As mentioned above, these include the "Refrasil" yarn products of H. I. Thompson Company and "Sil-Temp" materials of Haveg Industries, produced for example by acid leaching glass fibers pursuant to the techniques prescribed in the patent literature exemplified by U.S. Letters Patent No. 2,491,761 and No. 2,995,803. The silica yarn may be of any denier or twist available for the intended application or service, and since the properties of the silica yarn are prescribed by those commercially available and applicable for the intended service, they do not comprise a novel component per se or part of the present invention.

The sheathing or encasement for the silica yarn core strand is constructed of a surrounding, pliant woven structure or braid providing maximum flexibility and thereby enabling easy and unobstructed travel through the eyes of sewing needles and thread guides, and easy unobstructing flexing in passing over and around supports of short radii with thread or strand directional changes of up to 360° F. Continuous or solid sheathings such as formed by coatings on the other hand, are unsuitable because of their tendency to deform when bent and thus bind upon bending at sharp angles as when traveling through or over guides, supports, needle eyes, etc.

The tractable braided sheathing of this invention is fabricated or woven from fibers or strands of organic plastics exhibiting the property of substantially completely vaporizing at elevated temperatures without forming or producing deleterious incandescent particles or solid bodies which tend to degrade or interfere with surrounding materials or their function. Synthetic plastics found to possess this essential property for typical aerospace service include fluorocarbons such as "Teflon," a polytetrafluoroethylene product of E. I. du Pont de Nemours, polyethylene such as "Dacron" terephthalate, also a product of E. I. du Pont de Nemours, polymides or nylon, and regenerated cellulose such as rayon cellulose acetate.

The yarn products of this invention have been found uniquely suitable and effective in aerospace service and applications in both their handling and working characteristics, and in their ultimate function and operation of maintaining their integrity and in turn the integrity of the sewn body in enduring the agressive heat, and the thermal and physical shock conditions encountered in components of rocket missiles and space vehicles. For instance, these yarns have been found to possess ample strength and flexibility for effective machine sewing with conventional equipment in stitching heavy silica cloth facings on bodies of insulating materials of about 10 to 20 p.c.f. densities while enabling up to a nine-fold increase in production over previous hand sewing means heretofore necessary in utilizing a silica yarn. Moreover, the plastic braidings of this invention were found to vaporize completely, leaving the silica yarn component of the product wholly intact, securely retaining the stitched structure throughout its temperature range without the formation of molten material, incandescent particles or other materials adversely affecting the insulation or surrounding materials, and in particular the function of electronic equipment.

The following description sets forth a specific illustration or example of a preferred and typical, novel high tensile and flexural strength, pliant silica yarn product, and the construction and materials comprising the same, and demonstrates the utility and pronounced advantages thereof. It is to be appreciated, however, that the specific construction and/or materials described as employed in preparing this yarn product, or otherwise given hereinafter, are primarily exemplary and not to be construed as limiting the invention to any particular construction(s), composition(s), or material(s), or method of forming the same.

A typical silica yarn product of this invention, designed for use in fabricating insulating panels faced with a heavy weight silica cloth for a space vehicle, was produced by applying to a core of high purity commercial silica yarn of "Refrasil" yarn YT-100, produced by H. I. Thompson Company, an enclosing sheath of Nomex nylon yarn overbraid 200-100-C, Bright-Type E-2 yarn, a product of E. I. du Pont de Nemours Company. The pliant nylon sheath was formed about the silica yarn core strand in a conventional textile braid of medium tightness of braid style 50-12. This yarn was employed in a single needle sewing machine to stitch heavy silica cloth facings on both the front and back surfaces of 0.010 inch thick 36 x 36 or 72 inch panels of 16 p.c.f. insulation comprising Johns-Mansville's "Min-K" insulation, described in U.S. Letters Patent No. 3,055,831, in a one inch square quiltwork stitch pattern. The sewing operation and insulation fabrication which heretofore employed simply the silica yarn as thread necessitating hand stitching because of constantly repeated breakage of the silica yarn in the sewing machine, was readily carried out with the foregoing prepared yarn of this invention in the sewing machine without encountering any difficulties or undue breakage of the thread. Utilizing the described thread of this invention, the machine sewing was achieved at an average rate of 900 inches per 6 hours whereas the previous hand sewing method was at an average rate of 100 inches per 6 hours and was wholly unfeasible costwise. The stitched silica cloth "Min-K" insulating panels utilizing the yarn of this invention were exposed to temperatures of 1800° F. where-upon the braided nylon sheathing encasing the silica yarn completely vaporized upon reaching the temperatures of about 800 to 1100° F. leaving no solid particles as residue and forming no molten or incandescent material to affect the surroundings.

It will be understood that the foregoing details are given for purposes of illustration and not restriction, and that variations within the spirit of this invention are to be included within the scope of the appended claims.

What I claim is:

1. A yarn for high temperature applications having high strength and flexibility consisting essentially of an inner strand of silica fibers having an encasing sheathing of a pliant braid of strands of synthetic plastic which vaporize at temperatures of less than about 1000° F.

2. A yarn for high temperature applications having high strength and flexibility consisting essentially of an inner strand of silica fibers having an encasing sheathing of a pliant braid of strands of at least one plastic which vaporizes at high temperatures selected from the group consisting of fluorocarbons, polymides, polyesters and regenerated cellulose.

3. A yarn for high temperature applications of up to approximately 3000° F. having high strength and flexibility permitting machine handling and working consisting essentially of an inner strand of silica fibers having an encasing sheathing of a pliant braid of strands of at least one plastic which vaporizes at a temperature of less than about 1000° F. selected from the group consisting of fluorocarbons, polymides, polyesters and regenerated cellulose.

4. A yarn for high temperature applications of up to approximately 3000° F. having high strength and flexibility permitting machine handling and working consisting essentially of an inner strand body of silica fibers and a surrounding pliant braid of strands of polymide nylon resin fibers forming an encasing sheathing about the said inner strand of silica fibers.

References Cited

UNITED STATES PATENTS

| | | | |
|---|---|---|---|
| 2,327,104 | 8/1943 | Gudebrod | 57—140 XR |
| 2,334,400 | 11/1943 | Fether | 87—6 |
| 2,369,876 | 2/1945 | Warren | 57—147 |
| 2,509,290 | 5/1950 | Elvin et al. | 87—6 |
| 2,686,451 | 8/1954 | Shafer | 87—8 XR |
| 2,688,895 | 9/1954 | Houghton | 87—6 |
| 2,712,509 | 7/1955 | Biefeld. | |
| 3,035,476 | 5/1962 | Fogden | 87—6 XR |
| 3,078,755 | 2/1963 | Chace | 87—6 XR |
| 3,196,737 | 7/1965 | Wilkinson | 87—8 XR |
| 2,133,237 | 10/1938 | Slayter | 57—140 |
| 2,359,988 | 10/1944 | Gudebrod | 87—7 XR |
| 3,306,155 | 2/1967 | Zumeta et al. | 87—1 |

JOHN PETRAKES, *Primary Examiner.*